United States Patent [19]

Anderson

[11] Patent Number: 5,308,454

[45] Date of Patent: * May 3, 1994

[54] REACTOR PROCESS USING METAL OXIDE CERAMIC MEMBRANES

[75] Inventor: Marc A. Anderson, Madison, Wis.

[73] Assignee: Wisconsin Alumni Research Foundation, Madison, Wis.

[*] Notice: The portion of the term of this patent subsequent to Aug. 11, 2009 has been disclaimed.

[21] Appl. No.: 925,443

[22] Filed: Aug. 11, 1992

Related U.S. Application Data

[63] Continuation-in-part of Ser. No. 515,884, Apr. 27, 1990, Pat. No. 5,137,607.

[51] Int. Cl.$^5$ ............................................. C25B 3/00
[52] U.S. Cl. .............................. 204/59 R; 204/157.15; 204/DIG. 3
[58] Field of Search ............... 204/59 R; 421/111; 210/500.21, 500.26; 156/667, 389

[56] References Cited

U.S. PATENT DOCUMENTS

| | | | |
|---|---|---|---|
| T873,015 | 4/1970 | Finnerty, Jr. et al. | 204/193 |
| 2,685,564 | 8/1954 | Emmett, Jr. et al. | 204/145 |
| 3,431,188 | 3/1969 | Ito et al. | 204/157.1 |
| 3,458,418 | 7/1969 | Beckmann | 204/157.1 |
| 3,476,669 | 11/1969 | Beckmann et al. | 204/193 |
| 3,554,887 | 1/1971 | Feehs | 204/163 |
| 3,628,010 | 12/1971 | Oberwil et al. | 250/43 |
| 4,124,464 | 11/1978 | Miyatani et al. | 204/129 |
| 4,240,882 | 12/1980 | Ang et al. | 204/75 |
| 4,257,867 | 3/1981 | Hammond et al. | 204/265 |
| 4,619,838 | 10/1986 | Meier et al. | 427/53.1 |
| 4,650,554 | 3/1987 | Gordon | 204/129 |
| 4,650,648 | 3/1987 | Beer et al. | 422/186.07 |
| 4,790,923 | 12/1988 | Stillman | 204/268 |
| 4,892,712 | 1/1990 | Robertson et al. | 422/186 |
| 4,980,062 | 12/1990 | Block | 210/490 |
| 5,006,248 | 4/1991 | Anderson et al. | 210/500.26 |
| 5,028,568 | 7/1991 | Anderson et al. | 501/12 |
| 5,035,784 | 7/1991 | Anderson et al. | 204/158.14 |
| 5,104,539 | 4/1992 | Anderson et al. | 210/500.26 |
| 5,137,607 | 8/1992 | Anderson et al. | 204/59 R |

FOREIGN PATENT DOCUMENTS

| | | | |
|---|---|---|---|
| 0043394 | 11/1978 | Japan | B01D 13/02 |
| WO8900983 | 2/1989 | PCT Int'l Appl. | C04B 33/32 |
| WO8900985 | 2/1989 | PCT Int'l Appl. | C07C 15/12 |

Primary Examiner—Kathryn Gorgos
Attorney, Agent, or Firm—Quarles & Brady

[57] ABSTRACT

A reaction vessel for use in photoelectrochemical reactions includes as its reactive surface a metal oxide porous ceramic membrane of a catalytic metal such as titanium. The reaction vessel includes a light source and a counter electrode. A provision for applying an electrical bias between the membrane and the counter electrode permits the Fermi levels of potential reaction to be favored so that certain reactions may be favored in the vessel. The electrical biasing is also useful for the cleaning of the catalytic membrane. Also disclosed is a method regenerating a porous metal oxide ceramic membrane used in a photoelectrochemical catalytic process by periodically removing the reactants and regenerating the membrane using a variety of chemical, thermal, and electrical techniques.

5 Claims, 2 Drawing Sheets

REACTOR PROCESS USING METAL OXIDE CERAMIC MEMBRANES

STATEMENT REGARDING FEDERAL RIGHTS

This invention was made with United States Government support awarded by the Department of Energy (DOE), Grant No. DE-AC05-84OR214000. The United States Government has certain rights in this invention.

CROSS-REFERENCE TO RELATED APPLICATION

This application is a continuation-in-part of patent application Ser. No. 07/515,884 filed Apr. 27, 1990, now U.S. Pat. No. 5,137,607.

FIELD OF THE INVENTION

The present invention relates to an electrochemical or photo-electrochemical reaction vessel or container and methods for using such a reactor, and relates, in particular, to an electrochemical reaction vessel and methods for its use specifically adapted for convenient operation of electrochemical or photoelectrochemical reactions.

BACKGROUND OF THE INVENTION

It has previously been known that certain photochemical reactions may be performed more readily in an apparatus or a vessel which includes a provision for photoillumination of the reaction substrates, as well as their exposure to certain catalytic agents. For example, U.S. Pat. No. 3,476,667 discloses an apparatus for a photochemical reaction which includes a series of lamps disposed in the reaction vessel and suitable means to stir an appropriate solution within the reaction vessel to ensure mixing of reactives. Cooling tubes may also be provided in such a device to facilitate any necessary cooling to dissipate excess heat created by the energy released from the reaction.

Certain types of photochemical reactions in which the incident energy of reaction is provided by light radiation can be electrically biased to facilitate certain reaction products. At least one example is known, as shown in U.S. Pat. No. 4,124,464, of the use of a catalytic semiconductor anode in a water photolysis cell driven by incident solar radiation and in which the catalytic electrode is electrically biased so as to facilitate the hydrolysis of water in the desired reaction. It has been the previous practice in the art for such a reactor, which requires a transition metal electrode to properly catalyze the reaction, to fabricate the transition metal electrode in a single piece, the surface area of which is increased by scoring or other forms of indentation, such as disclosed in the above identified patent.

It has been previously demonstrated in the art that certain forms of metal oxide materials can be created which have a greatly enhanced surface area. One form of such metal oxide materials is known as a metal oxide ceramic membrane. The metal oxide ceramic membranes are typically formed of transition metal elements, such as titanium, silicon, zinc or other similar elements which have useful catalytic or photocatalytic properties. The metal oxide membranes are ceramic in that they are formed of a plurality of initially discrete particles which are fused together in a sintering or fusing process, usually by baking in an oven, to form a continuous unitary and solid material. Such metal oxide ceramic materials are referred to as membranes in that, when fired at appropriate temperatures (e.g. up to 550° C. for $TiO_2$ and 1000° C. for $Al_2O_3$), the resulting materials are porous, in the sense that materials may actually flow through the membranes if the support substrate is porous. Thus, the membranes may be thought of as analogous to biological membranes in that they are porous to materials of certain sizes, have a characteristic particle size and size of typical and maximum pores, but are by contrast formed of relatively rigid and stable inorganic metal oxide covalent bonds. It has been previously demonstrated, as exemplified by published PCT application WO 89/00985, and U.S. Pat. No. 5,035,784 that a metal oxide ceramic membrane can be usefully applied to the photodegradation of complex organic molecules. The use of ceramic membranes to treat waste streams to degrade environmental contaminants would be greatly facilitated if methods existed to regenerate such catalytic membranes as they become fouled, a regular occurrence in waste stream treatment.

SUMMARY OF THE INVENTION

The present invention is summarized in that a method for operating photoelectrochemical reactor includes regenerating the porous ceramic membrane catalytic material by treatment with heat and adjustment to pH.

It is an object of the present invention to provide a photoelectrochemical reaction vessel which may be used for a wide variety of photoelectrochemical or electrochemical reactions which may be catalyzed by metal oxide ceramic materials.

It is another object of the present invention to provide a photoelectrochemical reaction vessel which provides for improved contact to the catalytic agent and good throughput of the reaction materials.

It is another object of the present invention to operate a photocatalytic reactor so as to degrade chlorinated hydrocarbons without producing harmful by-products.

It is yet another object of the present invention to provide a photoelectrochemical reaction vessel in which the substrate of the catalytic agent may be electrically biased, and the electrical bias may be altered so as to remove from the catalytic membrane any metals or other materials deposited thereon.

Other objects, advantages, and features of the present invention will become apparent from the following specification when taken in conjunction with the accompanying drawings.

DESCRIPTION OF THE PREFERRED EMBODIMENT

In accordance with the present invention, a reaction vessel is described which is particularly suitable for photochemical, electrochemical, or photoelectrochemical reactions. In that regard, the reaction vessel is particularly designed so as to permit the input of light, so as to readily make available to the reaction substrates a catalytic material, and further it may be provided with electrical biasing means so that the particular desired reaction can be favored over other possible reactions by appropriately electrically biasing the contents of the vessel.

Figure 1:
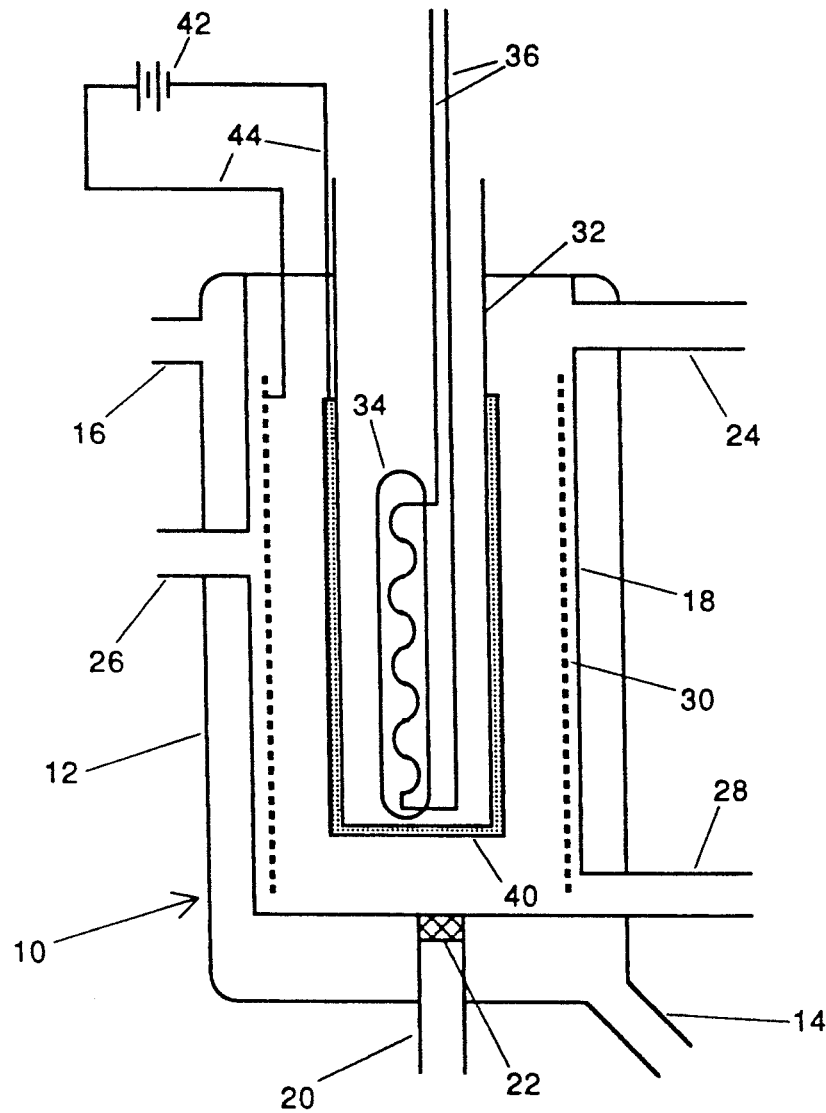
FIG. 1 is a plan schematic view of a photoelectrochemical reaction vessel constructed in accordance with the present invention.

Shown in FIG. 1 is a schematic cross-sectional view of an embodiment of a photoelectrochemical reaction vessel, generally designated at 10, constructed in accordance with the present invention. The exterior of the reaction vessel 10 includes a cooling chamber or jacket 12 disposed around the entire exterior of the reaction vessel 10. A cooling fluid entry port 14 and a cooling fluid exit port 16 are provided so as to permit the entry and removal of cooling fluids. The ports could, of course, be reversed, or provided at any desired locale within the exterior of the cooling vessel 12, so long as the input and output ports permit the flow of cooling fluid around the exterior of the reaction vessel 10.

Inside of the cooling chamber 12 is located a reaction chamber 18. Located extending downward from bottom of the center portion of the reaction chamber 18 is a gas entry port 20 which has positioned in its upper end a glass frit 22. The glass frit 22 is intended to prevent the flow of liquids down into the gas entry port 20. A gas outlet port 24 is provided extending outward from the top of the reaction chamber 18. A liquid entry port 28 extends into the reaction chamber 18 and a liquid outlet port 26 extends outward from the other side thereof. It is to be understood that the reaction vessel is intended both for use with liquid and gaseous phase reactions, but that, however, if only a particular phase, i.e. liquid or gas, is desired the inlet and outlet ports for the phase not utilized in the reaction could be omitted from the particular reaction vessel for that reaction.

Positioned just inside of the exterior walls of the reaction chamber 18 is a counter electrode 30. The counter electrode is formed of an electrically conductive material suitable for the particular photoelectrochemical reaction which is to take place in the reaction vessel. The counter electrode is preferably of a mesh or grid configuration, so as to have a relatively large surface area exposed to the fluids inside of the reaction chamber 18. Such a counter electrode might preferably be formed of platinum, carbon, or other highly durable conductive material. In many applications, it would be desirable for the reaction chamber 18 to be of cylindrical shape, in which case the counter electrode 30 can be a cylindrical cage of material positioned and spaced just inside of the interior walls of the reaction chamber 18.

Centrally located in the reaction chamber 18 is an inner tube 32. While the other components of the reaction vessel 10, such as the cooling jacket 12 and the reaction container 18, may be formed of any particular durable material as is appropriate, such as metallic, glass, or any other durable material, it is desired and advantageous that the material of the inner tube 32 be of a transparent material, such as glass. The inner tube 32 is a cylindrical member extending into the reaction chamber 18 which is closed at its bottom end. Positioned inside of the inner tube 32 is a light source in the form of a lamp 34 connected by suitable electrical wiring, indicated at 36, to an external source of electric power (not shown) capable of providing illuminating electrical energy to the lamp 34.

The inner tube 32 serves as a support surface for a layer of a metal oxide ceramic membrane 40 coated on the exterior of the tube. The metal oxide ceramic membrane 40 is formed of an oxide of a metal having desirable catalytic properties, such as typically a transition metal element. Suitable metals for such a metal oxide ceramic membrane include titanium, silicon, zirconium, and other similar elements. The preferred metal oxide membrane is formed of titanium dioxide. The metal oxide ceramic membrane is a porous, durable material formed from the sintering or fusing of small particles of the metal oxide material together to form a unitary and continuous solid material. The metal oxide membrane need not be homogeneously formed of a single metal element, but could be a mixture of such elements. It is also possible, and will often be desirable, to dope the metal oxide membrane with a dopant element differing in valence from the predominant metal of the membrane. Such dopants may be used to increase the electrical conductivity of the membrane, by adding excess free electrons or holes, or to change the reaction characteristics of the membrane.

By suitable manipulation of the method of forming of the metal oxide ceramic membrane, and by varying the firing temperature, it is possible to create such a metal oxide membrane having a wide range of size of the constituent particles, and having a wide range of effective porosity. For catalytic purposes it may be desirous that the particles of the ceramic membrane be relatively small in size, and that the porosity be as large as is practical, in order to provide the highest available effective surface area of the catalyst to the reactants in the fluid inside of the reaction chamber 18. The fluid could be either gaseous or liquid. Alternatively, if the reaction in the vessel is also to include a filtration process, it may be desirable for the pores in the membrane to be of a smaller, defined size so that the membrane may be used for filtration as well as catalysis.

Such a metal oxide ceramic membrane can be created on the exterior of a glass tube, such as the inner tube 32, by repeatedly dipping the glass tube into a sol of dilute and small particles of the metal oxide in suspension. As the tube is removed from the sol, the particles will accumulate on the exterior of the tube. Firing of the tube and coating together then yields a ceramic porous membrane adhered to the exterior of the glass tube 32. The thickness of the coating may be adjusted by varying the number of dippings or the number of firings so that numerous coats of material are added to the exterior of the inner tube 32 to create a membrane as thick as is desired for the particular application. In order that the metal oxide ceramic membrane be conducting, it is desirable to dope the sol, and thus, the metal oxide ceramic material with certain metal atoms having different valence than the predominant metal in the membrane to provide excess electrons or holes. In addition, to facilitate electrical connection to the metal oxide ceramic membrane, it is helpful if the inner tube 32 has formed on its exterior surface a conductive layer, such as a very thin layer of metallic or metal oxide material, such as tin oxide, tungsten, aluminum, or other elemental metal. If such a metallic coating is utilized, electrical connection to the metal oxide ceramic membrane can be made merely by an electrical connection to the metallic coating on the exterior of the inner tube, which thus underlies the metal oxide ceramic membrane.

The light source could be positioned anywhere in the reaction vessel as is desired. Alternative forms of light source, such as fiber optic strands coated with the metal oxide membrane, may also be used.

The reaction vessel of FIG. 1 further includes an electrical biasing means 42 which is connected by suitable electrical connecting devices, such as is schematically indicated at 44, to both of the metal oxide ceramic membrane 40 and the counter electrode 30. The electrical biasing means 42 is preferably an electrical biasing device capable of applying a potential between the membrane 40 and the counter electrode 30. The potential would normally be a DC voltage in the range of several volts, but could in some applications desirably be an alternating voltage varying over time. In addition, it is desirable if the biasing means 42 is capable of reversing the polarity of the applied electrical potential so that the relative polarity of the potential applied between the membrane 40 and the counter electrode 30 can be reversed as desired.

The photoelectrochemical reaction vessel of FIG. 1 is intended to be a very flexible and adaptable reaction vessel in which can be conducted photoelectrochemical and photochemical reactions of a wide variety. It is particularly adapted for photoelectrochemical reactions in which it is advantageous to have an electrode with an adjustable Fermi level. By biasing the membrane 40 relative to the counter electrode 30, it is possible to adjust the Fermi level of the membrane to match that of the reaction to be taking place inside of the reaction vessel, so as to favor different reactions or to drive a reaction different than would normally occur in the absence of a biasing voltage.

The reaction vessel is particularly suitable for a number of reactions. For example, a reaction which may be catalyzed by a titania catalyst such as could be contained in the metal oxide ceramic membrane 40, is the conversion of methane ($CH_4$) and a hydroxyl group (OH) to methanol ($CH_3OH$). The provision of a biasing voltage between the electrodes of the reaction vessel facilitates the creation of the desired end product in this kind of reaction. In addition, since the reaction is capable of electrical biasing, it may be used for other similar reactions such as the hydrolysis of water.

Another particularly useful application for the reaction vessel of FIG. 1 comes about in the use of a reaction vessel such as that of FIG. 1 in a waste treatment process. It has previously been demonstrated that metal oxide titania membranes are useful for the photocatalysis of a variety of organic molecules into smaller less toxic organic molecules. This therefore suggests the use of metal oxide ceramic membranes as components of a waste treatment stream in which the large or durable complex organic molecules are reduced to smaller molecules which can readily be introduced into the environment without danger or harm. The reactor 10 of FIG. 1 may be used for such a process However, waste streams eligible for such treatment are, almost by definition, heterogeneous and variable mixtures containing other impurities, including metals in solution or suspension, which could be reduced during the reaction to coat the exterior surface of the catalytic membrane 40. Thus, any design for such a reactor must include provisions for regenerating or cleaning the catalytic material. In order to clean any impurities or fouling materials which may be deposited on the membrane 40, it would be possible to cease the flow of the waste stream periodically, and then to apply a reversing voltage between the membrane 40 and the counter electrode 30, to drive the constituents or metals which have been coated onto the membrane back into solution, so that they may be washed from the reaction vessel 10. Through such a regeneration process of electrochemical stripping, the life and durability of the catalytic membrane used to catalyze the degradation of undesirable organic chemicals can be substantially lengthened. Because of the mechanical durability of the metal oxide ceramic membrane 40, other regeneration techniques may also be utilized to remove deposited material from the catalytic membrane. Useful regeneration techniques include washing with acids or alkaline solutions, burning of contaminants by high temperature treatment of the membrane (up to the original firing temperature), and steam cleaning of the membrane. Clearly any of these regeneration techniques would have the effect of prolonging the life of the reaction vessel by making the catalytic material more available for catalysis again.

Figure 2:
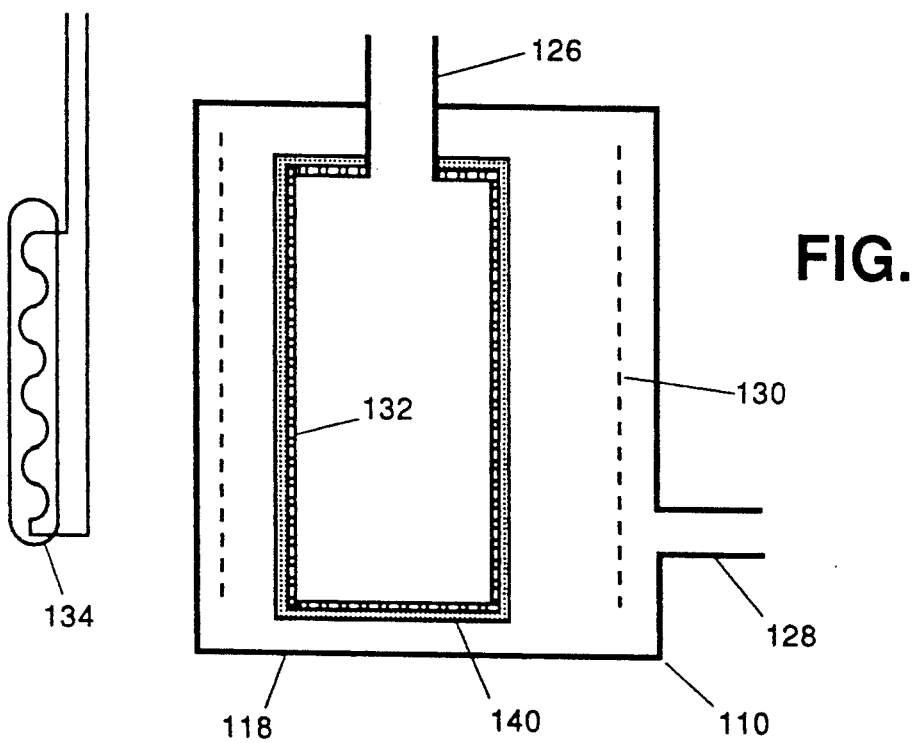
FIG. 2 is a schematic view of an alternative embodiment of a reaction vessel in accordance with the present invention which is particularly adapted to filtration as well as catalytic reaction

Shown in FIG. 2 is an alternative embodiment of a reaction vessel 110 constructed in accordance with the present invention. In the reaction vessel 110, components similar to corresponding components of the reaction vessel 10 have been given similar reference numerals, with a 100 prefix added to them. The reaction vessel 110 includes a metal oxide membrane 140 applied to a support surface 132. In the reaction vessel 110, the support surface 132 is formed of a porous material, such as porous sintered stainless steel or a porous glass tube. The pores in the support surface 132 are preferably significantly larger than the average pore size in the membrane 140. The light source 134 in the reaction vessel 110 is not located in the center of the reaction vessel 110, but is located on at least one side, or optionally surrounding, the vessel 110. At least portions of the sides of the reaction chamber 118 must therefore be transparent. If desired, the light source 134 could be omitted so that sunlight may be used as the light source to energize the system. If solar illumination is used, the membrane 140 used must be capable of absorbing energy in the solar spectrum.

The advantage of the vessel 110 of FIG. 2 is that separations can be performed at the same time as catalysis. By withdrawing material from the inside of the porous support surface 132, the transfer of molecules smaller than the pore size of the membrane 140 into the interior of the vessel can be favored. This withdrawal could be assisted by vacuum pumping. Thus, as a reaction is catalyzed by the membrane 140, reaction products could be drawn through the membrane 140 and the porous support 132, so that additional reaction substrate is drawn in turn into the membrane.

One reaction which does not require electrical biasing to a titania ceramic membrane to achieve catalysis is the photodegradation of complex organic molecules. Degradation of organic compounds, notably chlorinated hydrocarbons, can be achieved in either the gaseous or the liquid phase with porous titanium dioxide ceramic membranes or materials made from these. It has nevertheless been found that in operating such a reaction system, the system can be operated so as to avoid the creation of noxious by-products and further that the titanium dioxide material, when fouled, can be regenerated by appropriate treatment.

EXAMPLES

This example was based on the photodegradation of trichloroethylene (TCE) by a titanium oxide porous ceramic membrane. Since this reaction is catalyzed by the titania without biasing, no electrical biasing was required. The titanium dioxide porous membrane was formed through a sol-gel process to create small pellets of porous ceramic materials with high porosity and surface area. The transparent pellets were placed in a packed bed reactor illuminated by four 4 Watt fluorescent black lights. The 0.56 g of $TiO_2$ pellets were exposed to a 300 ml/minute stream of TCE in a single pass. The TCE concentration was reduced from 460 ppm at the inlet to 3 ppm at the outlet, a 99.6% conversion of the TCE. In passes performed at room temperature (23° C.), the ratio of $CO_2$ produced/TCE degraded was estimated to be between 0.3 and 0.8, depending on flow rate through the reactor. Based on stoichiometry and FTIR measurements, it was ascertained that monochloroacetates were produced as stable intermediates which remained on the $TiO_2$ pellets.

Other reactors using $TiO_2$ in some form to degrade TCE and other chlorinated hydrocarbons can result in the creation of considerable quantities of phosgene, which is considered more noxious than TCE. Using this system, both TCE and perchloroethylene (PCE) have been degraded in an annular photoreactor at temperatures of 55° C.-60° C. without producing any detectable phosgene. The parameters responsible for the absence of phosgene production include limitation of available water vapor, higher operating temperature, and the relatively long dwell time of the exposure of the organic molecules to the catalyst made possible by the porous form of the $TiO_2$ material.

When the photodegradation of TCE was performed in the presence of water, photocatalytic activity decreased. Again, using an annular photoreactor packed with about 30 g. of porous $TiO_2$ membrane pellets experiments were performed at 70° C. with 400 ppm TCE feed, 22% $O_2$, and 3% $H_2O$. The flow rate of the reactant gas stream was adjusted to be 100 ml/minute, and then the input gas streams were saturated with water. After the reaction reached steady state, TCE conversion and the stoichiometry of $CO_2$ produced/TCE degraded were 100% and 2, respectively over 1.5 days of operation, suggesting complete degradation. However, thereafter the catalytic activity decreased gradually and TCE conversion decreased to 50% and the stoichiometric ratio $CO_2$ produced/TCE degraded declined to 0.4. Again, it was believed due to accumulation of intermediates in the pellets.

To verify the regenerability of the catalyst, the pellets were placed in distilled deionized water, where it was found that they would lower the pH of the water, indicating the pellets had become acidified. A possible intermediate is HCl which would produce such acidification. To regenerate the pellets, the membrane pellets were fired at 300° C., and then treated with an alkaline solution until they were neutral pH. After these treatments, the pellets were replaced in the tubular photoreactor under conditions of 400 ppm TCE feed, 20% $O_2$ and 2.3% $H_2O$ at 70° C. The results were a TCE conversion of 100% and a stoichiometry of $CO_2$ produced/TCE degraded of 2. Thus, it was demonstrated that the pellets were effectively regenerated by the treatment.

The present invention is subject to many variations and additions which will be apparent to those of ordinary skill in the art. Accordingly, it is intended that the present invention not be limited to the particular embodiment illustration described above, but shall embrace all such modified forms thereof as come within the scope of the following claims.

What is claimed is:

1. A method of utilizing a catalytic metal oxide ceramic membrane to perform photoelectrochemical processing comprising the steps of
    providing a reaction vessel in which reactants are exposed to catalytic action by a transition metal element in a porous metal oxide ceramic membrane;
    introducing reactants into the vessel to be catalyzed by the catalytic transition metal element in the membrane;
    periodically removing reactant from the vessel; and
    regenerating the membrane by removing any contaminants therefrom so that the catalytic transition metal element is exposed for further chemical processing.

2. A method as claimed in claim 1 wherein the regenerating step is conducted by heat treatment of the membrane.

3. A method as claimed in claim 1 wherein the regenerating step is conducted by steam cleaning of the membrane.

4. A method as claimed in claim 1 wherein the regenerating step is conducted by acid washing of the membrane.

5. A method as claimed in claim 1 wherein the regenerating step is conducted by alkaline washing of the membrane.

* * * * *